(12) United States Patent
Kamisetty et al.

(10) Patent No.: US 9,096,211 B2
(45) Date of Patent: Aug. 4, 2015

(54) CONTROL SYSTEM HAVING POWERTRAIN LOCK

(75) Inventors: SriVidya Lavanya Kamisetty, Aurora, IL (US); Michael Anthony Spielman, Jr., Brookfield, IL (US)

(73) Assignee: Caterpillar Inc., Peoria, IL (US)

( * ) Notice: Subject to any disclaimer, the term of this patent is extended or adjusted under 35 U.S.C. 154(b) by 684 days.

(21) Appl. No.: 13/420,019

(22) Filed: Mar. 14, 2012

(65) Prior Publication Data
US 2013/0244832 A1 Sep. 19, 2013

(51) Int. Cl.
| B60K 31/00 | (2006.01) |
| B60W 10/06 | (2006.01) |
| B60W 10/18 | (2012.01) |
| F16H 61/472 | (2010.01) |
| F16H 61/465 | (2010.01) |
| E02F 9/20 | (2006.01) |

(52) U.S. Cl.
CPC ............... *B60W 10/06* (2013.01); *B60K 31/00* (2013.01); *B60W 10/182* (2013.01); *E02F 9/2079* (2013.01); *F16H 61/465* (2013.01); *F16H 61/472* (2013.01); *B60W 2540/10* (2013.01); *Y10T 477/65* (2015.01)

(58) Field of Classification Search
CPC ...................................................... B60K 31/00
See application file for complete search history.

(56) References Cited

U.S. PATENT DOCUMENTS

| 4,414,863 | A | 11/1983 | Heino |
| 5,161,633 | A | 11/1992 | Torrielli et al. |
| 6,418,366 | B1 | 7/2002 | Danz et al. |
| 7,226,387 | B2 | 6/2007 | Thompson et al. |
| 7,416,037 | B2 | 8/2008 | Huelser et al. |
| 7,578,769 | B2 | 8/2009 | Kageyama et al. |
| 7,593,801 | B2 | 9/2009 | Lock et al. |
| 7,641,588 | B2 | 1/2010 | Thomson et al. |
| 7,854,681 | B2 * | 12/2010 | Sopko et al. .................... 477/34 |
| 2005/0221949 | A1 | 10/2005 | Oshita et al. |
| 2008/0103019 | A1 | 5/2008 | Cronin et al. |
| 2009/0076691 | A1 | 3/2009 | Burke et al. |
| 2009/0088295 | A1 | 4/2009 | Dahl et al. |
| 2009/0182478 | A1 | 7/2009 | Whitney et al. |
| 2010/0087993 | A1 | 4/2010 | Roli et al. |
| 2010/0174456 | A1 | 7/2010 | Beaudoin et al. |

FOREIGN PATENT DOCUMENTS

| EP | 1484213 | 12/2004 |
| WO | 2007030070 | 3/2007 |
| WO | 2009045284 | 4/2009 |

* cited by examiner

*Primary Examiner* — Derek D Knight
(74) *Attorney, Agent, or Firm* — Finnegan, Henderson, Farabow, Garrett & Dunner, LLP

(57) ABSTRACT

A powertrain control system is disclosed for use with a mobile machine. The powertrain control system may have an engine, and a continuously variable transmission operatively coupled to the engine. The powertrain control system may also have an operator input device configured to generate a signal indicative of a desired speed of the engine, a feature selector usable by an operator to select activation of a powertrain control feature, and a controller in communication with the engine, the continuously variable transmission, the operator input device, and the feature selector. The controller may be configured to make a determination that the operator has selected activation of the powertrain control feature via the feature selector, lock a speed of the engine based on the determination and the signal, and lock a torque output of the continuously variable transmission based on the determination and the locked speed of the engine.

17 Claims, 4 Drawing Sheets

CONTROL SYSTEM HAVING POWERTRAIN LOCK

TECHNICAL FIELD

The present disclosure is directed to a control system and, more particularly, to a powertrain control system having a lock that regulates transmission output torque and engine speed.

BACKGROUND

Machines such as wheel loaders, dozers, off-highway trucks, and other heavy equipment are used to perform many tasks. To effectively perform these tasks, the machines require an engine that provides significant torque through a transmission to one or more ground engaging devices. In order to control the speed and torque output of the ground engaging devices, the operator of these machines is typically provided with three different foot pedals. One of the three pedals is actuated to affect engine fueling. Another of the three pedals is actuated to affect vehicle braking. The third of the three pedals is actuated to disengage the engine from the transmission and, if depressed enough, also affects vehicle braking.

Although this configuration may be suitable when a mechanical, step-change transmission is utilized to transmit power from the engine to the ground engaging devices, it may be insufficient and/or cumbersome when a continuously variable transmission (CVT) is utilized. A CVT is an automatic type of transmission that provides an infinite number of output ratios within its ratio range. For example, a hydraulic CVT can include a pump and a fluid motor that receives pressurized fluid from the pump. Depending on a discharge flow rate and pressure of the pump, the motor speed and output torque at the ground engaging device may be varied. When using a CVT, a primary goal is to keep the engine as efficiently stable as possible. In this situation, the strategy described above of constantly changing engine fueling and/or constantly disconnecting the engine from the transmission may work against the efficiency goal. Therefore, an alternative strategy is required to efficiently control operation of a machine utilizing a CVT.

An alternative method of powertrain control is described in U.S. Pat. No. 7,854,681 of Sopko et al. that issued on Dec. 21, 2010 (the '681 patent). The '681 patent describes a machine having a CVT, left and right operator pedals, a gear selector, and a controller in communication with the CVT, the pedals, and the gear selector. The left foot pedal generates a first signal indicative of a desired amount of power that should be transmitted to propel the machine. The right foot pedal generates a second signal indicative of a desired engine speed. The gear selector generates a third signal associated with a travel speed limit of the machine. The controller generates a torque output command for the CVT that is a function of the first and second signals. The torque output command is then modified based on the third signal. The machine also includes a throttle lock feature that allows the operator of the machine to lock an engine speed at a desired level, while allowing independent control of the CVT. The throttle lock feature may allow for operation of the machine without manual manipulation of the right foot pedal.

Although the system of the '681 patent may provide for efficient regulation of a CVT, it may still be less than optimal. In particular, the operator is still required to modulate the left foot pedal during operation, which can be cumbersome and tiring for the operator. In addition, there may be times when the operator-selected engine speed (i.e., the engine speed selected via the throttle lock feature) is inefficient for current operations and the system of the '681 patent does not provide a way to override this feature.

The powertrain control system of the present disclosure solves one or more of the problems set forth above and/or other problems of the prior art.

SUMMARY

One aspect of the present disclosure is directed to a powertrain control system. The powertrain control system may include an engine, and a continuously variable transmission operatively coupled to the engine. The powertrain control system may also include an operator input device configured to generate a signal indicative of a desired speed of the engine, a feature selector usable by an operator to select activation of a powertrain control feature, and a controller in communication with the engine, the continuously variable transmission, the operator input device, and the feature selector. The controller may be configured to make a determination that the operator has selected activation of the powertrain control feature via the feature selector, lock a speed of the engine based on the determination and the signal, and lock a torque output of the continuously variable transmission based on the determination and the locked speed of the engine.

Another aspect of the present disclosure is directed a method of controlling a powertrain. The method may include receiving input from an operator indicative of a desired engine speed, and receiving a selection from the operator associated with activation of a powertrain control feature. The method may also include locking a speed of the engine based on the selection and the desired engine speed, and locking a torque output of a continuously variable transmission based on the selection and the locked speed.

DETAILED DESCRIPTION

Figure 1:
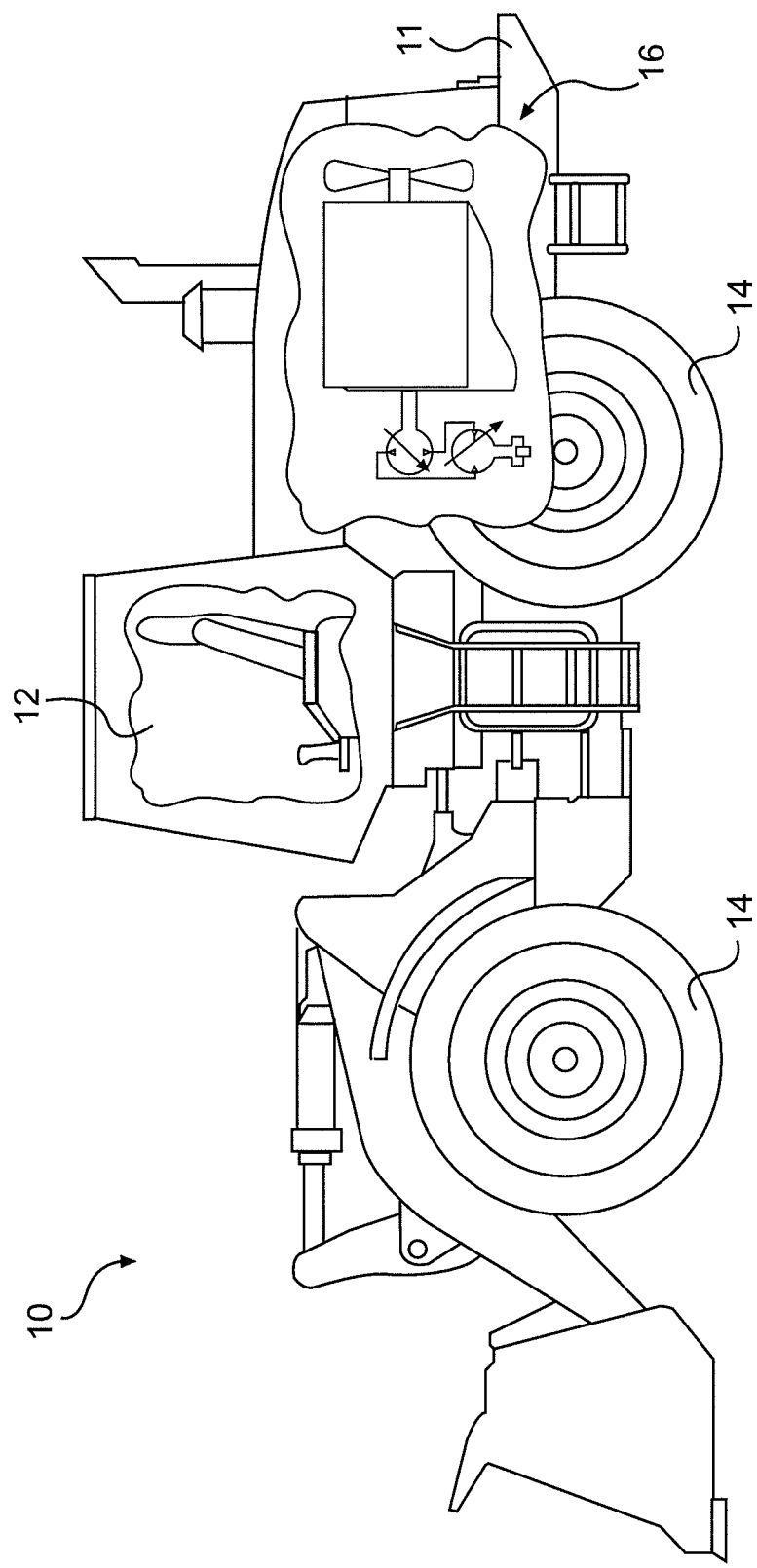
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or another industry known in the art. For example, machine 10 may embody a mobile machine such as the wheel loader depicted in FIG. 1, a bus, an on- or off-highway haul truck, or any other type of mobile machine known in the art. Machine 10 may include a frame 11, an operator station 12 supported by frame 11, one or more traction devices 14 rotatably connected to frame 11, and a powertrain 16 supported by frame 11 and operatively connected to drive at least one of traction devices 14 in response to input received from operator station 12.

Figure 2:
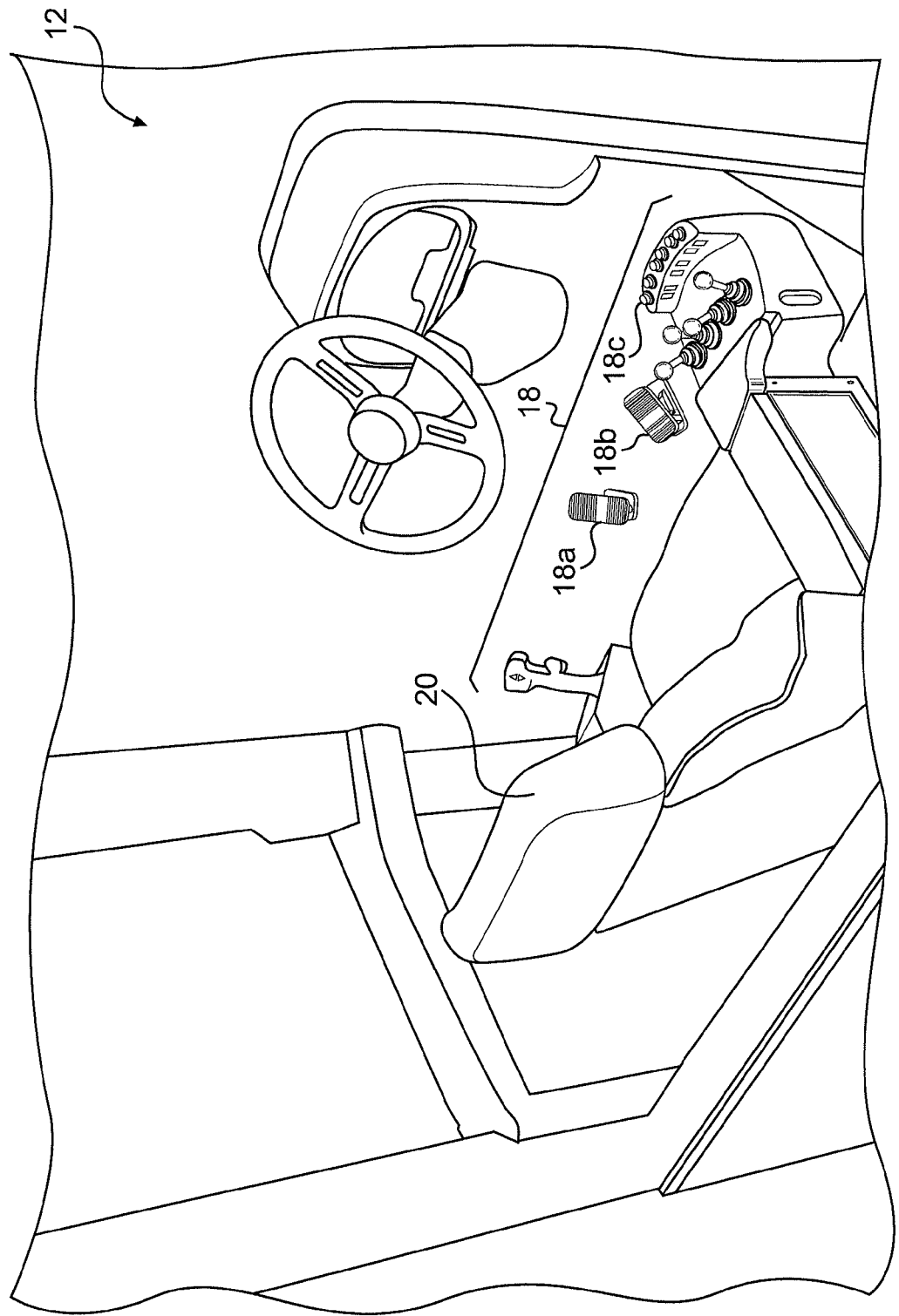
FIG. 2 is a pictorial illustration of an exemplary disclosed operator station that may be used in conjunction with the machine of FIG. 1.

As illustrated in FIG. 2, operator station 12 may embody a generally enclosed cabin having devices that receive manual signals indicative of a desired machine travel maneuver. Specifically, operator station 12 may include one or more interface devices 18 located proximate an operator seat 20. Interface devices 18 may initiate movement and/or activate features of machine 10 by producing signals that are indicative of a desired machine function. In one embodiment, interface devices 18 may include a left foot pedal 18a, a right foot pedal 18b, and a feature selector 18c. As an operator manipulates left foot pedal 18a and/or right foot pedal 18b (i.e., displaces left and/or right foot pedals 18a, 18b away from a neutral position), the operator may expect and affect a corresponding machine travel function. As the operator manipulates features selector 18c, the operator may be selecting activation of a particular control feature (e.g., a powertrain lock feature). It is contemplated that interface devices other than foot pedals and feature selectors such as, for example, joysticks, levers, switches, knobs, wheels, and other devices known in the art, may additionally or alternatively be provided within operator station 12 for travel control of machine 10, if desired.

Traction devices 14 (referring to FIG. 1) may embody wheels located at each side of machine 10 (only one side shown). Alternatively, traction devices 14 may include tracks, belts or other known traction devices. It is contemplated that any combination of the wheels on machine 10 may be driven and/or steered.

Figure 3:
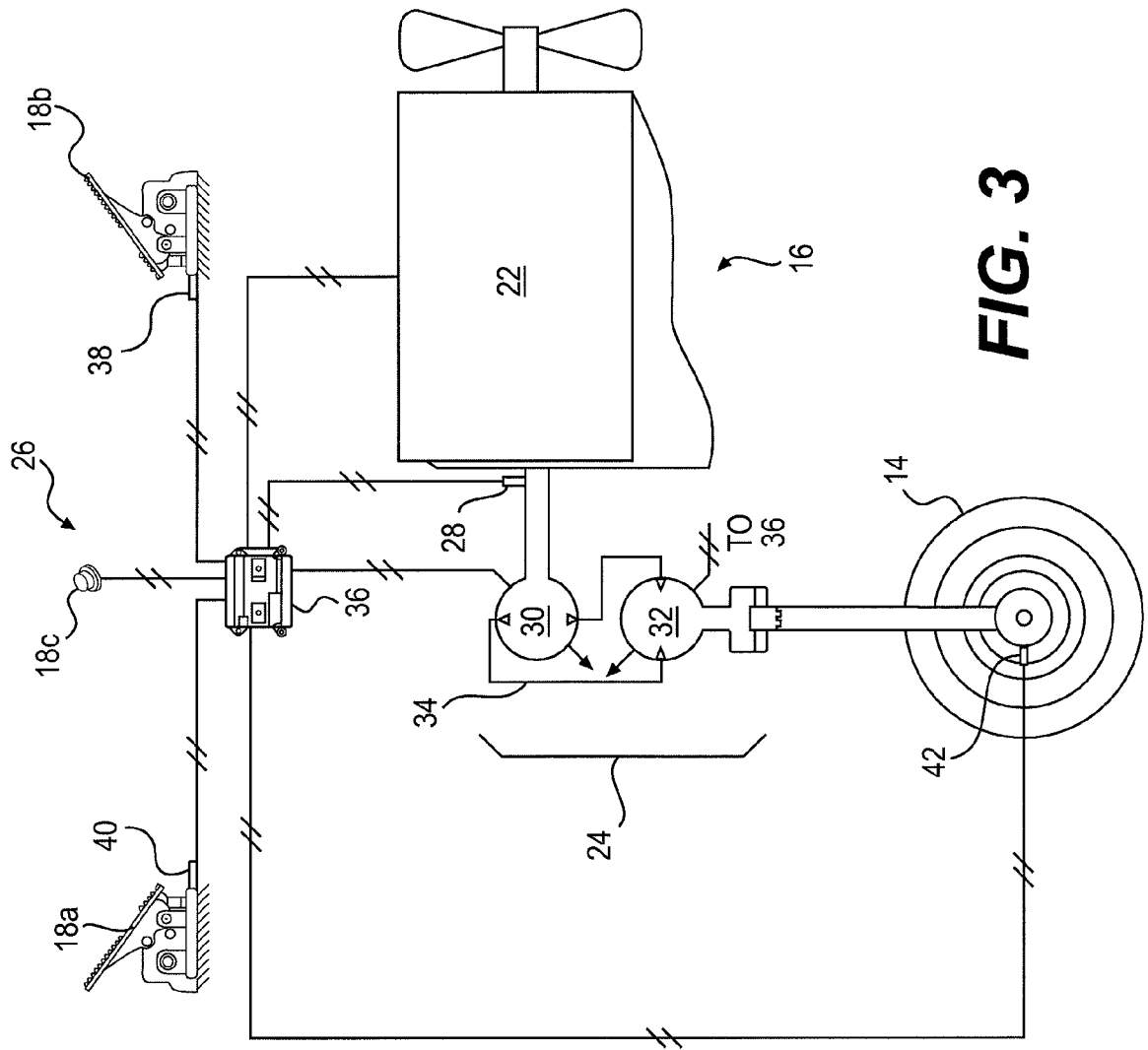
FIG. 3 is a diagrammatic illustration of an exemplary disclosed powertrain control system that may be used in conjunction with the machine of FIG. 1.

As illustrated in FIG. 3, powertrain 16 may be an integral package configured to generate and transmit power to traction devices 14. In particular, powertrain 16 may include an engine 22 operable to generate a power output, a transmission 24 connected to receive the power output and transmit the power output in a useful manner to traction devices 14 (referring to FIG. 1), and a control system 26 configured to regulate the operation of engine 22 and transmission 24 in response to one or more signals generated by left foot pedal 18a, right foot pedal 18b, feature selector 18c, and one or more different sensors.

Engine 22 may be an internal combustion engine having multiple subsystems that cooperate to produce a mechanical and/or electrical power output. For the purposes of this disclosure, engine 22 is depicted and described as a four-stroke diesel engine. One skilled in the art will recognize, however, that engine 22 may be any other type of internal combustion engine such as, for example, a gasoline or a gaseous fuel-powered engine. The subsystems included within engine 22 may include, for example, a fuel system, an air induction system, an exhaust system, a lubrication system, a cooling system, and other appropriate systems.

Engine 22 may be at least partially controlled with right foot pedals 18b. That is, as right foot pedal 18b is manipulated by an operator, right foot pedal 18b may generate an electric signal directed to a controller 36 of control system 26 signifying a desired engine speed. For example, right foot pedal 18b may have a minimum position corresponding with a low-idle speed of engine 22, and be movable through a range of positions to a maximum position corresponding to a rated speed of engine 22. A sensor 38, such as a switch or potentiometer, may be provided in association with right foot pedal 18b to sense the displacement position thereof and produce a corresponding signal responsive to the displaced position. This displacement signal from sensor 38 may be directed through controller 36 to engine 22 (e.g., to the fuel system, the air induction system, the exhaust system, or to another system of engine 22) to control the rotational speed of engine 22. Although engine 22 has been described as a low-idle engine (i.e., as the minimum displacement position of right foot pedal 18b being associated with the low-idle speed of engine 22), it is contemplated that engine 22 could alternatively be a high-idle engine (i.e., the minimum displacement position of right foot pedal 18b could be associated with a high-idle speed of engine 22 and further displacement of right foot pedal 18b could result in a reduction of engine speed), if desired.

A sensor 28 may be associated with engine 22 to sense a rotational speed thereof. In one example, sensor 28 may embody a magnetic pickup type of sensor associated with a magnet embedded within a rotating component of powertrain 16 such as a crankshaft or flywheel of engine 22. During operation of engine 22, sensor 28 may sense the rotating field produced by the magnet and generate a signal corresponding to the rotational speed of engine 22.

Transmission 24 may embody, for example, a continuously variable transmission (CVT). Transmission 24 may be any type of continuously variable transmission such as, for example, a hydraulic CVT, a hydro-mechanical CVT, an electric CVT, an electro-mechanical CVT, a parallel-path hydraulic or electric CVT, or any other configuration as would be apparent to one skilled in the art.

A CVT generally consists of a driving element 30 and a driven element 32 that is hydraulically, electrically, and/or mechanically connected to driving element 30. In the simplified exemplary hydraulic CVT of FIG. 3, driving element 30 is a hydraulic pump, such as a bi-directional (i.e., over-center), variable-displacement, piston-type hydraulic pump. It is contemplated, however, that driving element 30 could alternatively embody a uni-directional pump, a fixed-displacement pump, or a rotary-type of pump (or an electric generator, as in an electric or electro-mechanical CVT), if desired. In this same configuration, driven element 32 is shown as a hydraulic motor, such as a bi-directonal, variable-displacement, piston-type motor. Similar to driving element 30, it is contemplated that driven element 32 may alternatively embody a uni-directional motor, a fixed-displacement motor, or a rotary-type of motor (or an electric motor, as in an electric or electro-mechanical CVT), if desired. Driving element 30 may be connected to power driven element 32 with pressurized fluid via an open or closed circuit 34 in response to displacement commands directed to driving and/or driven elements 30, 32. In some situations, driven element 32 may alternatively power driving element 30 in reverse direction, for example during braking of machine 10.

Transmission 24 may be at least partially controlled with left and right left foot pedals 18a, 18b. That is, as right foot pedal 18b is manipulated by the operator, the signal generated by right foot pedal 18a may signify, in addition to a desired engine speed, a desired output torque of transmission 24. Thus the greater the displacement of right foot pedal 18b, the greater the output torque of transmission 24. In contrast, as left foot pedal 18a is manipulated by the operator, left foot pedal 18a may generate a signal directed to controller 36 signifying a desired reduction in transmission output torque. For example, left foot pedal 18a may have a minimum position corresponding to a maximum torque output of transmission 24 (i.e., no reduction in the output torque requested by right foot pedal 18b), and be movable through a range of positions to a maximum position corresponding with a minimum torque output (i.e., a greatest reduction in the transmission output torque). A sensor 40, such as a switch or potentiometer, may be provided in association with left foot pedal 18a to sense the displacement position thereof and produce a corresponding signal responsive to the displaced position. The displacement signal from sensor 40 may be directed through controller 36 to transmission 24 to control the torque output of driving and/or driven elements 30, 32 via adjustment to the displacement(s) thereof. In one embodiment, the signal generated by sensor 40 may have a value that corresponds to a percent of an allowable torque output available for a current speed of machine 10.

In some embodiments, left foot pedal 18a may also be associated with braking of traction device 14. In these embodiments, left foot pedal 18a may be movable from the minimum displacement position through a threshold intermediate position to the maximum displacement position. As described above, the minimum displacement position of left foot pedal 18a may be associated with the maximum torque output of transmission 24. However, in contrast to the embodiment described above, left foot pedal 18a, in this embodiment, may alternatively generate a signal indicative of the minimum torque output of transmission 24 at the threshold intermediate position. Further displacement of left foot pedal 18a, from the threshold intermediate position, may then result in increasing braking of traction device 14.

A sensor 42 may be associated with transmission 24 and/or traction device 14 (referring to FIG. 1) to sense a travel speed of machine 10. In one example, sensor 42 may embody a magnetic pickup type of sensor associated with a magnet embedded within a rotational component of powertrain 16 such as a transmission output shaft. During operation of machine 10, sensor 42 may sense the rotating field produced by the magnet and generate a signal corresponding to the rotational speed of transmission 24 and/or the corresponding travel speed of machine 10.

Controller 36, together with interface devices 18, sensors 40 and 42, control components (not shown) of engine 22, and displacement control mechanisms of transmission 24, may constitute control system 26. Controller 36 may embody a single microprocessor or multiple microprocessors that include a means for controlling the operation of powertrain 16 in response to the received signals. Numerous commercially available microprocessors can be configured to perform the functions of controller 36. It should be appreciated that controller 36 could readily embody a general machine microprocessor capable of controlling numerous machine functions. Controller 36 may include a memory, a secondary storage device, a processor, and any other components for running an application. Various other circuits may be associated with controller 36 such as power supply circuitry, signal conditioning circuitry, solenoid driver circuitry, and other types of circuitry.

One or more transmission control maps relating the left foot pedal displacement, right foot pedal displacement, status of feature selector 18c, detected travel speed, desired travel speed, desired engine speed, desired torque output, torque output command, torque output limits, and/or other control variables may be stored within the memory of controller 36. Each of these maps may be in the form of tables, graphs, and/or equations and include a compilation of data collected from lab and/or field operation of powertrain 16. Controller 36 may reference these maps and control engine 22 and transmission 24 to bring the operation of powertrain 16 in line with expected and/or desired performance of machine 10.

Figure 4:
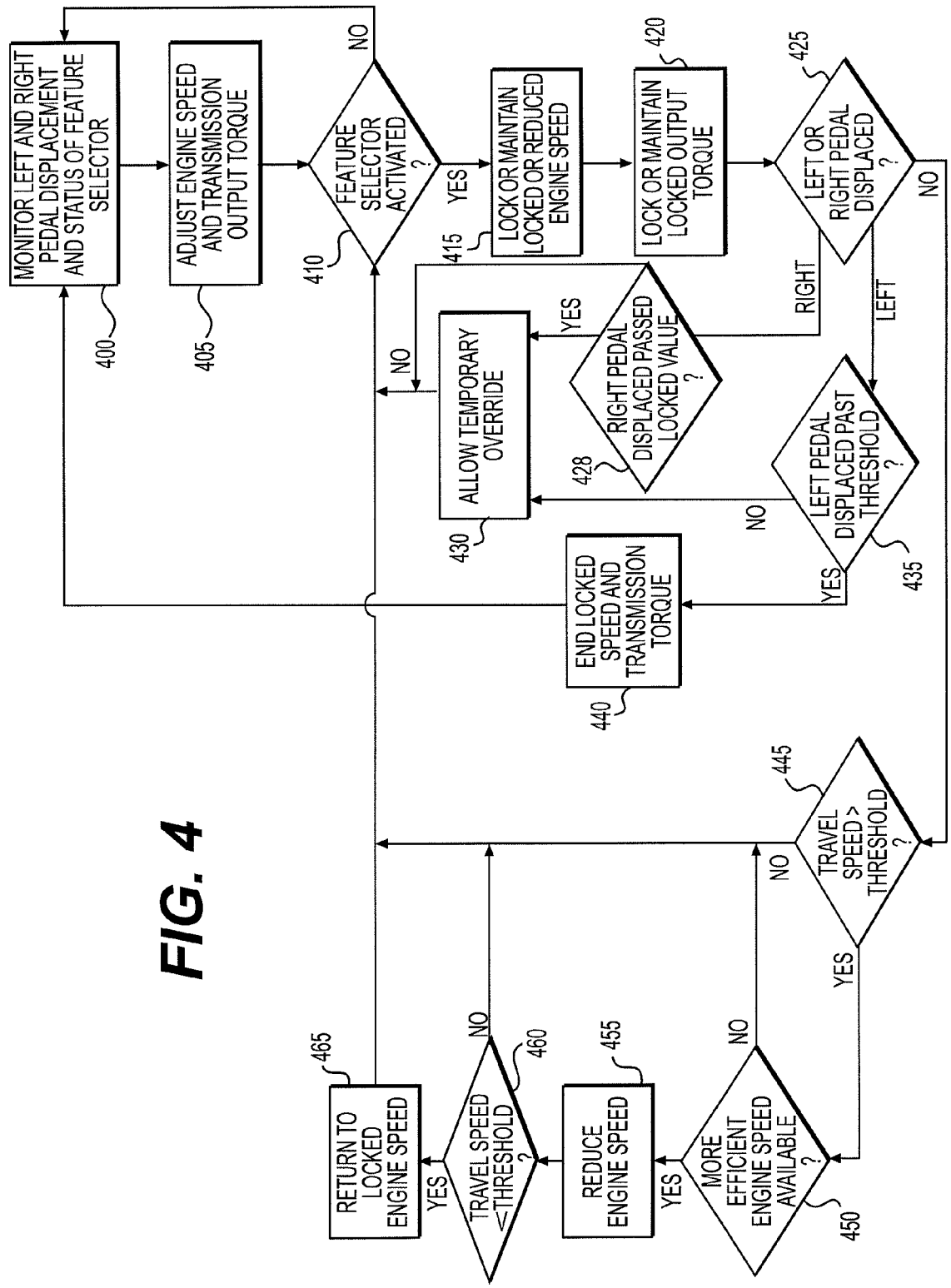
FIG. 4 is a flowchart depicting an exemplary disclosed operation that may be performed by the powertrain control system of FIG. 3.

FIG. 4 depicts an exemplary method of controlling powertrain 16 that is regulated by controller 36. FIG. 4 will be discussed in more detail in following section to further clarify aspects of the disclosed system.

INDUSTRIAL APPLICABILITY

The disclosed powertrain control system may be applicable to any mobile machine having a continuously variable transmission. The disclosed powertrain control system may provide for enhanced efficiency and control of the associated powertrain, while also reducing operator effort. Operation of powertrain control system 26 will now be described in detail with reference to FIG. 4.

As illustrated in the flowchart of FIG. 4, the first step in controlling powertrain 16 may include monitoring a status of interface devices 18. In particular, controller 36 may monitor the displacement position of left foot pedal 18a, the displacement position of right foot pedal 18b, and manipulation of feature selector 18c (Step 400). From the displacement signals received via sensors 40, 42, controller 36 may determine a desired speed of engine 22 and a desired output torque of transmission 24 (i.e., a desired percent of an allowable output torque for the current travel speed of machine 10). Based on these desired values, controller 36 may then make adjustments to engine 22 and transmission 24 such that a difference between an actual engine speed and the desired engine speed and a difference between an actual torque output and the desired torque output are reduced (Step 405). Engine speed may be adjusted through adjustments of the fuel system, the air induction system, the exhaust system, or any combination of these adjustments. Transmission output torque may be adjusted through adjustment (e.g., displacement adjustment) of one or both of driving element 30 and driven element 32.

Controller 36 may also determine if feature selector 18c has been activated by the operator of machine 10 (Step 410). If feature selector 18c has not been activated, control may return to step 400. However, when feature selector 18c has been activated by the operator of machine 10, controller 36 may then lock the speed of engine 22 at the current engine speed (Step 415). For example, the operator may depress right foot pedal 18b until a desired engine speed is achieved, and then manipulate feature selector 18c to lock this engine speed for use in completion of a particular task. By locking the speed of engine 22, the operator may be relieved of further need to manipulate right foot pedal 18b, allowing the operator to focus efforts on other more critical tasks. This may help to reduce operator fatigue. In addition, the speed selected by the operator may be a speed known to the operator as the most efficient or controllable speed for the particular task.

Activation of feature selector 18c may also trigger controller 36 to lock the output torque of transmission 24 (Step 420). In particular, upon locking of the engine speed, controller 36 may lock the output torque at a particular percent of an available output torque for the current travel speed of machine 10. The percent value may be determined via one or more lookup maps stored in memory as a function of the locked engine speed. For example, for a locked engine speed of about 50% of the rated speed at a current travel speed of 8 kph, controller 36 may lock a torque output of transmission 24 at about 50% of a maximum amount of torque that is allowed at 8 kph. As the travel speed of machine 10 varies, the value of the output torque of transmission 24 may also vary (along with variations in the maximum amount of allowed torque), but remain locked at about 50% of the maximum amount of allowed torque.

At any time during operation of machine 10, the operator may chose to adjust the engine speed and/or transmission output torque away from the locked values, either temporarily or permanently. In particular, controller 36 may continuously monitor the displacement positions of left and right foot pedals 18a, 18b to determine if such a deviation is desired and what type of deviation is desired (Step 425). If the operator displaces right foot pedal 18b to cause an increase in engine speed (i.e., if controller 36 detects displacement of right foot pedal 18b to a position corresponding to an engine speed greater than the locked engine speed—Step 328), controller 36 may allow a temporary override of the locked engine speed (Step 430) and institute an engine speed corresponding to the displacement position of right foot pedal 18*b*. Once the operator releases right foot pedal 18*b*, controller 36 may return the speed of engine 22 to the previously locked value, as long as feature selector 18*c* is still activated. That is, control may cycle from step 430 back through steps 410-420. It should be noted that manipulation of right foot pedal 18*b* to a position corresponding with an engine speed less than the locked engine speed (Step 328:No) may have no affect on control of powertrain 16.

If the operator displaces left foot pedal 18*a*, controller 36 may compare the displacement position to a threshold value before continuing (Step 435). If left foot pedal 18*a* has been displaced to a position less than a threshold position (Step 435:No), control may follow to step 430, where a temporary override of transmission output torque output may be allowed in the same manner as described above for engine speed. However, when at step 435 controller 36 determines that left foot pedal 18*a* has been displaced by at least at threshold amount (Step 435:Yes), controller 36 may instead end locked speed and torque operations (Step 440), and control may return to step 400. In one embodiment, the threshold amount may be at least 75% of the range from the minimum displacement position to the maximum displacement position. In another embodiment, the threshold amount may be about equal to the intermediate displacement position at which braking of traction devices 14 is activated. It is contemplated that, in some applications, left foot pedal 18*a* may need to be displaced by the threshold amount for at least a threshold amount of time before locked speed and torque operations are cancelled. In these applications, the threshold amount of time may be a function of machine travel speed.

Returning to step 425, during locked speed and torque control (i.e., when the operator has not displaced left or right foot pedals 18*a*, 18*b*), controller 36 may continuously compare the current travel speed of machine 10 to a travel speed threshold value (Step 445). In an exemplary embodiment, the travel speed threshold value may be associated with a speed at which machine 10 is most likely traversing long distances between locations at a worksite or even between worksites. At this speed, non-travel related machine functions (e.g., tool functions) may generally not be used. In the disclosed embodiment, the travel speed threshold may be about 20 kph. In other embodiments, the travel speed threshold may be variable and based at least partially on a travel speed limit selected by the operator. When controller 36 determines that the travel speed of machine 10 is less than the threshold speed, control may return to step 410 without further action being taken.

However, when controller 36 determines at step 445 that the current travel speed of machine 10 is greater than the threshold travel speed, controller 36 may conclude that the operator of machine 10 will most likely not be requesting activation of non-travel related functions, and then determine if a more efficient engine speed is available (Step 450). That is, controller 36 may determine if engine 22 can be operated at a lower rotational speed (i.e., at a speed that requires less fuel) and still drive machine 10 at the same travel speed. If such a speed is not available, control may return to step 410. When a more efficient speed is available, however, controller 36 may override the operator-locked speed and reduce the speed of engine 22 (Step 455).

A reduction of engine speed without adjustment to transmission 24 may result in a deviation from the current travel speed of machine 10. Accordingly, controller 36 may adjust the gear ratio of transmission 24 at about the same time as adjusting the speed of engine 22 such that the travel speed of machine 10 remains substantially constant.

After reducing the speed of engine 22, controller 36 may monitor operation of engine 22 to determine if engine 22 is producing power at a level less than demanded by current conditions or by the operator. Specifically, controller 36 will compare a travel speed of machine 10 to a minimum threshold travel speed (Step 460). If controller 36 determines that machine 10 is traveling at a speed less than the minimum travel speed, controller 36 may return the speed of engine 22 to the previously locked value (Step 465) and control may return to step 410. This situation may occur, for example, when machine 10 is traveling at a relatively high speed (e.g., above about 20 kph), controller 36 reduces the rotational speed of engine 22 to a more efficient level, and then the operator activates a non-travel related function (e.g., the operator activates the tool system of machine 10). In this situation, a power demand may be placed on engine 22 that cannot be supplied by engine 22 at the current travel speed and thus the travel speed falls below the minimum threshold travel speed. Accordingly, in this situation, controller 36 may raise the speed of engine 22 back to the previously locked value.

Control over powertrain 16 may, in some embodiments, be affected by activation of a park brake (not shown). For example, it is contemplated that when feature selector 18*c* is activated at the same time that the park brake is activated, only the speed of engine 22 may be locked. In contrast, if the park brake is not active, both the speed of engine 22 and the torque output of transmission 24 may be locked. In addition, if the status of the park brake changes (i.e., if the park brake is activated or deactivated) while feature selector 18*c* is activated, controller 36 may responsively deactivate feature selector 18*c*.

Powertrain control system 26 may provide for enhanced efficiency through on-demand automated control of engine speed and transmission output torque. That is, through the use of operator-locked engine speed and transmission output torque and selective and automated overriding of these locked values at opportune times, the efficiency of machine 10 may be improved. Powertrain control system 26 may also provide for enhanced control over powertrain 16. In particular, the ability to temporarily deviate from the locked engine speed and transmission output torque and then quickly return, may provide the operator with the ability to tailor short-term power supply with short-term power demands, while still maintaining general operation of the machine at levels efficient for the long-term. In addition, the ability to lock not only engine speed but also transmission output torque, may help to reduce operator effort and alleviate operator fatigue. That is, the operator may not be required to constantly manipulate left foot pedal 18*a* and right foot pedal 18*b* during operation of machine 10, thereby requiring less physical exertion and generating fewer distractions from more important tasks.

It will be apparent to those skilled in the art that various modifications and variations can be made to the disclosed powertrain control system. Other embodiments will be apparent to those skilled in the art from consideration of the specification and practice of the disclosed powertrain control system. It is intended that the specification and examples be considered as exemplary only, with a true scope being indicated by the following claims and their equivalents.

What is claimed is:

1. A powertrain control system for a mobile machine, comprising:

an engine;

a continuously variable transmission operatively coupled to the engine;

an operator input device configured to generate a signal indicative of a desired speed of the engine;

a travel speed sensor configured to generate a signal indicative of a travel speed of the mobile machine;

a feature selector usable by an operator to select activation of a powertrain control feature; and a controller in communication with the engine, the continuously variable transmission, the operator input device, the travel speed sensor, and the feature selector, the controller being configured to:

make a determination that the operator has selected activation of the powertrain control feature via the feature selector;

lock a speed of the engine based on the determination and the signal;

lock a torque output of the continuously variable transmission based on the determination and the locked speed of the engine;

determine, based on the signal from the travel speed sensor, that a current travel speed of the mobile machine is associated with high-speed travel during which non-travel related machine functions are not used; and responsively reduce the speed of the engine below the locked speed to a more fuel-efficient speed.

2. The powertrain control system of claim 1, wherein the controller is configured to lock the torque output of the continuously variable transmission at a percent of a maximum available torque for a given travel speed of the mobile machine.

3. The powertrain control system of claim 2, wherein the percent at which the torque output of the continuously variable transmission is locked is based on the locked speed of the engine.

4. The powertrain control system of claim 3, wherein the controller is further configured to selectively adjust the torque output of the continuously variable transmission during reduction of the speed of the engine such that a substantially constant travel speed of the mobile machine is maintained during the reduction.

5. The powertrain control system of claim 3, wherein the controller is further configured to return the speed of the engine to the locked speed when the current travel speed falls below a threshold value.

6. The powertrain control system of claim 1, wherein:

the operator input device is a first pedal located within an operator cabin of the mobile machine;

the signal from the first pedal is further indicative of a desired output torque of the continuously variable transmission; and the powertrain control system further includes a second pedal located in the operator cabin and configured to generate a signal indicative of a desired reduction in the output torque of the continuously variable transmission.

7. The powertrain control system of claim 6, wherein:

manipulation of the first pedal temporarily overrides the locked speed of the engine and the locked torque output of the continuously variable transmission; and manipulation of the second pedal temporarily overrides the locked torque output of the continuously variable transmission.

8. The powertrain control system of claim 7, wherein:

the temporary override caused by manipulation of the first pedal includes only a temporary increase in the locked speed and locked torque output; and the temporary override caused by manipulation of the second pedal includes only a temporary decrease in the locked torque output.

9. The powertrain control system of claim 6, wherein the controller is further configured to:

receive operator input indicative of a desire to cancel operation at the locked speed and locked output torque; and selectively return control over the speed of the engine and the output torque of the continuously variable transmission to the operator based on the operator input.

10. The powertrain control system of claim 9, wherein the operator input is associated with manipulation of the second pedal past a threshold displacement position for at least a threshold amount of time.

11. The powertrain control system of claim 10, wherein manipulation of the second pedal past the threshold displacement position also activates braking of the mobile machine.

12. The powertrain control system of claim 9, wherein the operator input is associated with manipulation of a third pedal associated with a brake of the mobile machine.

13. The powertrain control system of claim 1, wherein the controller is configured to:

lock only the speed of the engine when a park brake of the mobile machine is active;

lock the speed of the engine and the torque output of the continuously variable transmission when the park brake is inactive; and end locking of the speed of the engine and the torque output of the continuously variable transmission when a status of the park brake changes.

14. A method of controlling a powertrain, comprising:

receiving input from an operator indicative of a desired speed of an engine;

receiving a selection from the operator associated with activation of a powertrain control feature;

locking a speed of the engine based on the selection and the desired speed;

locking a torque output of a continuously variable transmission based on the selection and the locked speed;

detecting a current travel speed of an associated mobile machine;

determining that the current travel speed of the associated mobile machine is associated with high-speed travel during which non-travel related machine functions are not used; and responsively reducing the speed of the engine below the locked speed to a more fuel-efficient speed.

15. The method of claim 14, wherein locking the torque output of the continuously variable transmission includes locking the torque output of the continuously variable transmission at a percent of a maximum available torque for a given travel speed of the associated mobile machine.

16. The method of claim 15, wherein the percent at which the torque output of the continuously variable transmission is locked is based on the locked speed of the engine.

17. The method of claim 16, further including selectively adjusting the torque output of the continuously variable transmission during reduction of the speed of the engine such that a substantially constant travel speed of the associated mobile machine is maintained during the reduction.

* * * * *